United States Patent [19]

Hosokawa et al.

[11] 4,011,185

[45] Mar. 8, 1977

[54] AQUEOUS INSULATING VARNISHES

[75] Inventors: Etsuo Hosokawa, Yokohama; Misao Waki, Chiba; Katsumi Asada, Yokohama, all of Japan

[73] Assignee: Showa Densen Denran Kabushiki Kaisha, Japan

[22] Filed: Jan. 20, 1976

[21] Appl. No.: 650,599

Related U.S. Application Data

[63] Continuation-in-part of Ser. No. 440,212, Feb. 6, 1974, abandoned.

[30] Foreign Application Priority Data

| Apr. 13, 1973 | Japan | 48-42013 |
| May 25, 1973 | Japan | 48-59150 |
| Oct. 18, 1973 | Japan | 48-117177 |
| Nov. 30, 1973 | Japan | 48-135152 |

[52] U.S. Cl. .................... 260/29.2 N; 260/9; 260/29.2 E; 260/75 T; 260/75 N; 428/458

[51] Int. Cl.² .............. C08G 63/76; C08G 63/68; C08J 3/06

[58] Field of Search ........ 260/29.2 E, 75 T, 29.2 N

[56] References Cited

UNITED STATES PATENTS

| 3,021,308 | 2/1962 | Caywood et al. | 260/75 R |
| 3,068,207 | 12/1962 | Iannicelli | 260/75 T |
| 3,205,192 | 9/1965 | Denson | 260/75 T |
| 3,397,254 | 8/1968 | Wynstra et al. | 260/75 T |
| 3,459,584 | 8/1969 | Caldwell | 260/75 T |
| 3,544,496 | 12/1970 | Formaini | 260/29.2 E |
| 3,709,846 | 1/1973 | Tsou | 260/29.2 E |
| 3,725,329 | 4/1973 | Jacoby et al. | 260/75 T |

*Primary Examiner*—Murray Tillman
*Assistant Examiner*—A. H. Koeckert
*Attorney, Agent, or Firm*—Ladas, Parry, Von Gehr, Goldsmith & Deschamps

[57] ABSTRACT

Insulating varnishes capable of forming a film possessing excellent electrical and mechanical properties can be obtained by reacting a reaction product of (1) a reactant of a dicarboxylic acid or a tricarboxylic acid or a derivative thereof comprising an aromatic dicarboxylic acid or a derivative thereof in an amount of at least 95 equivalent % [the term "equivalent" as used herein means (number of moles) x (number of reactive functional groups in one molecule)] of the total of the (1), (2) a primary diol and (3) an aliphatic polyhydric alcohol having at least 3 hydroxyl groups with (4) an aromatic teracarboxylic acid or derivative thereof, and subsequently dispersing the reaction product into an aqueous solution containing ammonia or an organic amine.

22 Claims, No Drawings

AQUEOUS INSULATING VARNISHES

CROSS REFERENCE TO RELATED APPLICATIONS

This is a continuation-in-part of our application Ser. No. 440,212 filed on Feb. 6, 1974, now abandoned.

BACKGROUND OF THE INVENTION

The present invention relates to a novel insulating varnish and, in particular, it is concerned with an aqueous high molecular weight polyester insulating varnish which develops no harmful waste gases of organic solvents when it is applied onto a substrate and baked and is capable of forming a film possessing good electrical and mechanical properties. The term "aqueous" as used herein is intended to include the cases where the varnish is in an aqueous dispersion or an aqueous emulsion as well as in an aqueous solution.

In the part, there have been practiced methods of producing polyester synthetic resins which comprise reacting a dicarboxylic acid with a polyhydric alcohol in the presence of an organic solvent such as cresol and xylenol, and, if desired, adding to the reaction mixture a hardener such as lead octanoate an aliphatic or aromatic diisocyanate. Among these polyester synthetic resins the resins produced from an aromatic dicarboxylic acid as the starting material are excellent particularly in heat resistance and electric insulation and possess good solvent resistance and mechanical properties, so that they have been used as an insulating film for magnet wire and any other articles in various applications. Usually, in forming these films a solution of the polyester resin in an organic solvent is coated on the surface of a substrate article and baked whereby the organic solvent is vaporized. However, it is impossible to completely treat and recover waste gases of solvents developing during baking which are harmful to the human body. Therefore, there is a need for novel insulating varnishes which will not develop such harmful gases.

Recently, in the fields of, in particular, paint and lacquer productions a variety of wat r soluble or dispersible paints using water as a solvent have been developed instead of organic solvent type paints for reasons of safety and sanitation in handling. Thus, methods for the production of water soluble polyester resins have been developed which comprise adding a tricarboxylic monoanhydride such as trimellitic monoanhydride to water insoluble polymer containing primary hydroxyl groups such as a polyester and reacting the resulting mixture in the presence of an inert solvent for a long period of time, and converting the remaining free carboxyl groups to ammonium salts to produce an water soluble polyester resin.

However, the above-mentioned process includes the use of lower molecular weight polymer containing primary hydroxyl groups rather than higher molecular weight polymer containing primary hydroxyl groups because the latter provides no water soluble resin. Further, even if a derivative such as monoanhydride of a tricarboxylic acid is reacted with a lower molecular weight polymer, the derivative is bonded only to the terminal of the polymer molecule and cannot almost participate in polymerization, thereby producing no higher molecular weight resin. In this case, if the temperature is further raised to polymerize the resin to have a higher molecular weight, the resulting resin is entirely brought into a gel state. In addition, there is present another disadvantage of requiring further process for removing the organic solvents used in the reaction.

Further, in accordance with the above-mentioned process only polymers obtained from unsaturated carboxylic acids or alcohols having an unsaturated bond as the polymer containing primary hydroxyl groups may be made soluble in water, and the water soluble resin obtained from the method forms a film extremely poor in electrical properties and toughness when it is applied and baked. Thus, since it is requested that a useful varnish as an insulating film for magnet wires generally should be derived from aromatic materials and contain adequate high molecular weight resin and be capble of forming a film excellent in electrical and mechanical properties such as electric insulation, heat resistance, flexibility, toughness, etc., the above-mentioned process using tricarboxylic acids can never produce such a varnish that meets these requirements and utilizes water as a solvent.

There is known another method for the production of water soluble varnishes which comprises reacting a mixture of (a) trimellitic acid or pyromellitic acid, (b) allyl ether of an alcohol having at least one free hydroxyl group, (c) terephthalic acid and (d) a polyhydric alcohol till the acid value of the resutling resin is below 70, cooling the resuting resin and subsequently neutralizing the resin with ammonia or an amine. However, like the previous method, this method suffers from gellation at an early stage in the course of the reaction, which results in no formation of a high molecular weight resin solution, whereby a film having good electrical and mechanical properties cannot be produced.

SUMMARY OF THE INVENTION

It is a primary object of the present invention to provide an aqueous insulating varnish dissolved or dispersed in water which causes no development of harmful waste gases of organic solvents during the production process and its use.

It is another object of the present invention to provide an insulating varnish of high molecular weight polyester resin capable of forming a film of good electrical and mechanical properties, heat resistance and toughness.

The other objects and advantages of the present invention will be apparent from the following description.

In view of the above-mentioned disadvantages which have been encountered in the conventional methods of producing water soluble varnishes, we have made earnest studies and found that an aqueous insulating varnish excellent in electrical and mechanical properties and capable of forming a film can be produced by reacting to a substantially complete degree (1) a reactant of a di-or tricarboxylic acid or a derivative thereof, at least 95 equivalent % of the reactant being an aromatic dicarboxylic acid or a derivative thereof the term "equivalent" as used herein means (number of moles) × (number of reactive functional groups in one molecule) and (2) a primary diol with (3) an aliphatic alcohol having no less than 3 hydroxyl groups in a ratio satisfying the following requirements:

$$\frac{a}{b+c}\left(1+\frac{c}{b+c}\right) \leq 1 \text{ and } \frac{a}{b+c} \geq 0.4$$

wherein $a$, $b$ and $c$ each represent equivalents of the aromatic di-or tricarboxylic acid or the derivative thereof, a primary diol and a primary polyhydric alcohol having at least 3 hydroxyl groups, respectively, reacting the resuting reaction product with (4) $d$ equivalents of a tetracarboxylic acid or a derivative thereof [$d$ is defined to satisfy the following requirements;

$$0.5\ ((b+c)-a) \leq d \leq (b+c)-a)$$

at a temperature above the melting point of said reaction product but below the sublimation temperature of the tetracarboxylic acid or the derivative thereof and causes no gellation for a period of time during which no gellation is caused to develop, and subsequently dispersing the resulting product into an aqueous solution containing ammonia or an organic amine.

DETAILED DESCRIPTION OF THE INVENTION

The reactant of di- or tricarboxylic acid (or derivative thereof) comprises 95 to 100 equivalent % of the reactant of an aromatic dicarboxylic acid or a derivative thereof.

The aromatic dicarboxylic acids used in the present invention include phthalic acid, isophthalic acid, terephthalic acid and the like, and the derivatives thereof include those whose carbonyl group is bonded by a group capable of being easily substituted with an alkoxy radical in alcohols, that is, lower alkyl esters and half-esters such as dimethyl esters, diethylesters, dipropyl esters, halides such as chlorides, and anhydrides.

In the present invention, dimethyl ester and diethyl ester of terephthalic acid may be preferably used from the standpoint of ease of reaction control, and mechanical strength and heat resistance and the like of a film obtained from the final product.

The di-or tricarboxylic acids other than the aromatic dicarboxylic acids stated above which may be used in the present invention include dicarboxylic acids having in their molecules one or more rings selected from the group consisting of an imide ring, a hydantoin ring, an imidazopyrrolone ring, and cyanuric acid. When such a polycarboxylic acid is used together with the aromatic di- or tricarboxylic acid in an amount up to 5 equivalent % of the total of the di- or tricarboxylic acid, they have no substantial effect on the mode of reaction of the aromatic di- or tricarboxyic acid, and these materials introduce heterocyclic rings such as imide rings into the molecules whereby insulating varnishes having a more excellent heat resistance are obtained. When the quantity of the above-mentioned polycarboxylic acid other than aromatic dicarboxylic acids is in excess of 5 equivalent %, the resulting film is poor in flexibility and unsuitable for practical use.

The dicarboxylic acids having an imide ring, a hydantoin ring or an imidazopyrrolone ring in their molecules may be prepared, for example, by the following reactions.

Dicarboxylic acids having an imide ring:

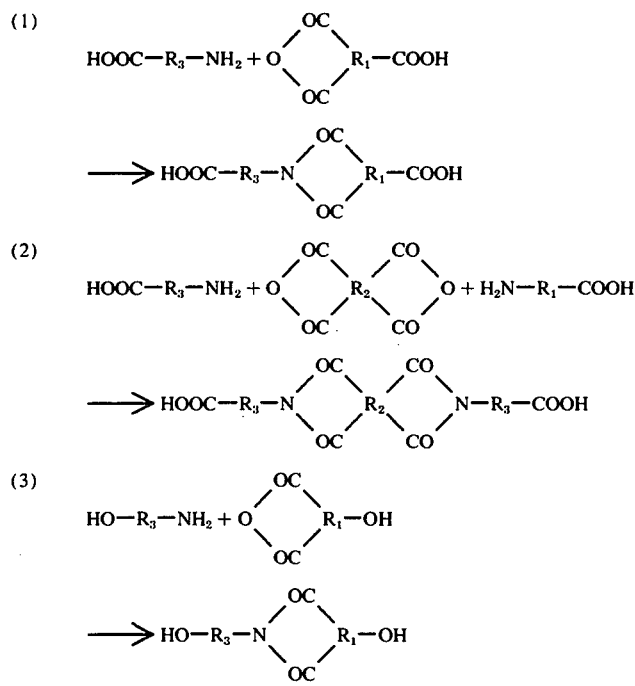

Dicarboxylic acids having a hydantoin ring:

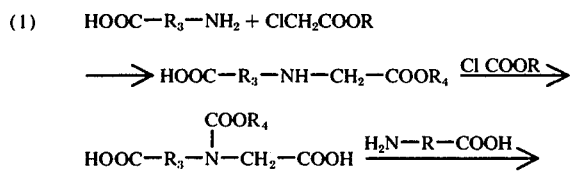

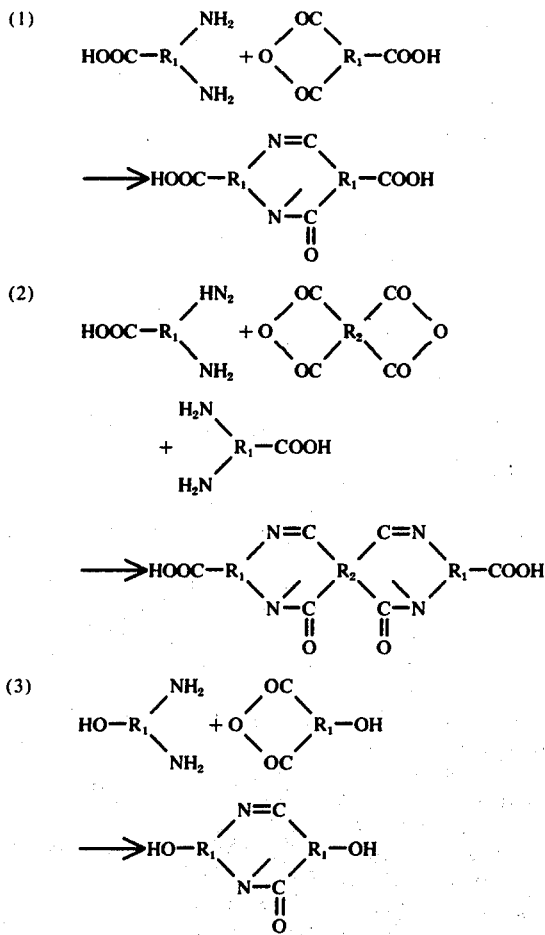

Dicarboxylic acid having an imidozopyrrolone ring:

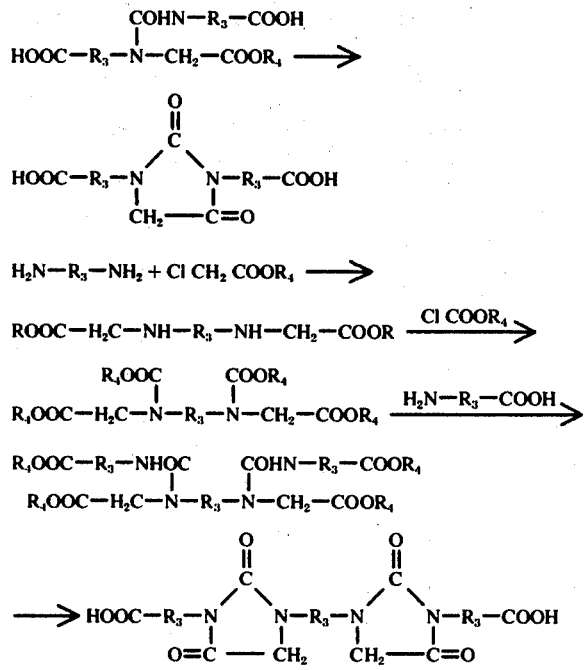

wherein $R_1$, $R_2$, $R_3$ and $R_4$ each may be same or different, and represent tetravalent-, trivalent-, divalent- and monovalent radicals. Among the above-mentioned carboxylic acids and derivatives thereof, aromatic dicarboxylic acids or the lower alkyl esters thereof are most suitable for this invention.

The primary diols used in the present invention include aliphatic or aromatic alcohols or alcohol equivalent containing two primary hydroxyl groups such as ethylene glycol, diethylene glycol, trimethylene glycol, tetramethylene glycol, neopentyl glycol, and bishydroxyethyl terephthalate. Ethylene glycol is most preferable from the standpoint of ease of reaction and cost. When aromatic alcohols such as bishydroxyethyl terephthalate is used, the insulating varnish produced is more excellent in heat resistance.

The aliphatic alcohols having at least 3 hydroxyl groups which may be used in the present invention include glycerol, diglycerol, trimethylolmethane, trimethylolethane, trimethylolpropane tris-2-hydroxyethyl isocyanurate (hereinafter referred to as THEIC) and the like. Glycerol or trimethylolpropane may preferably be used from the standpoint of electrical and mechanical properties of a film to be produced, ease of reaction and production cost. When these alcohols having at least 3 hydroxyl groups are partially or wholly replaced by polyhydric alcohols containing heterocyclic ring such as THEIC, the insulating varnish produced is extremely excellent in heat resistance.

The aromatic tetracarboylic acids used in the present invention include pyromellitic acid, 3,3',4,4'-benzophenone tetracarboxylic acid, naphthalene tetracarboxylic acid, bicyclooctenetetracarboxylic acid and the like. The term "derivative" of the aromatic tetracarboxylic acid is the same as that given hereinabove for the derivative of di- or tricarboxylic acid. Among the derivatives of the aromatic tetracarboxylic acids, the anhydrides especially dianhydrides, thereof are preferable; and dianhydride of pyromellitic acid is most preferable from the standpoint of ease of reaction and reaction control, and heat resistance of a film obtained from the final product.

The preferred organic amines used in the present invention include monoethanol amine, diethanol amine, triethanol amine and the like. When these amines are used, a portion of the amine forms amide bond with the carboxyl groups of the polymer due to high temperatures during baking. The amide bonds remain in the baked film and free carboxyl groups of the polymer decrease whereby insulated electric wires having an insulation of excellent film properties and good appearance are obtained.

The proportion of the starting materials (1), (2) and (3) to be used in accordance with the present invention must satisfy the following requirements;

$$\frac{a}{b+c}\left(1+\frac{c}{b+c}\right) \leq 1 \text{ and } \frac{a}{b+c} \geq 0.4$$

wherein: (1) the quantity of a di- or tri- carboxylic acid or derivative thereof is $a$ equivalent, (2) the quantity of a primary diol is $b$ equivalent and (3) the quantity of an aliphatic alcohol having at least 3 hydroxyl groups is $c$ equivalent. If the above proportion is followed, relatively high molecular weight resins can be obtained, and even when the reaction of (1), (2) and (3) is continued to increase degree of polymerization to an sufficient extent, no gellation takes place. This may be demonstrated by Flory equation with regard to critical conditions under which infinite network structure can be developed.

Also, when the proportion of the aromatic tetracarboxylic acid or derivative thereof to be used in accordance with the present invention is $d$ equivalent, the material is added to the reaction product of (1) (2) and (3) in an amount expressed by the equation: $0.5 ((b+c) - a) \leq d \leq 2 ((b+c) - a)$ and reacted therewith. When the quantity of the aromatic tetracarboxylic acid or the derivative thereof is below $0.5 ((b+c) - a)$ equivalents, the final reaction product is insolble in water, and, on the other hand, when the quantity is above $2 ((b+c) - a)$ equivalents, a film obtained from the reaction product is poor in mechanical properties such as flexibility and unsuitable for practical use. The most preferable quantity ranges from $0.8 ((b+c) - a)$ to $((b+c) - a)$ equivalents and it is within this range that resins having highest molecular weight and capable of being dissolved or dispersed in water can be obtained without accompanying gelatinization. In this case, the aromatic tetracaraboxylic acid or the derivative thereof is reacted with the reaction product of (1), (2) and (3) at a temperature above the melting point of the reaction product but below the sublimation temperature of the tetracarboxylic acid or the derivative thereof which causes no gellation of the reaction product and for a period of time during which no gellation is caused to develop.

The proportion of the starting materials (1), (2), (3) and (4), more specifically, should satisfy the following requirements. The component (1) is used in such a quantity that it should occupy 10 to 45 equivalent %, preferably 15 to 40 equivalent %; the component(2) is in the range of 20 to 52 equivalent %, preferably in the range of 30 to 50 equivalent %; the component (3) is in the range of 3 to 25 equivalent %, preferably in the range of 4 to 20 equivalent %; and the component (4) is in the range of 10 to 45 equivalent %, preferably in the range of 13 to 40 equivalent %, each equivalent % being based on the total equivalents of the components (1), (2), (3) and (4).

The final resin obtained is further forced to be dispersed in an aqueous solution containing ammonia or an organic amine. The amount of said ammonia or organic amine to be reacted may be optionally varied within the range in which the resin finally produced is made soluble in water. However, from the standpoint of electrical and mechanical properties of the film obtained the amount preferably is such that a pH value of the aqueous solution of resin after the reaction is complete is in the range between 5.0 and 8.0, preferably 5.5 and 7.5. Further, since the insulating varnish thus produced in accordance with the present invention can be diluted with water, it is possible to produce the aqueous solution in any resin concentration. However, the resin content ranging from 30 to 40 % by weight is suitable from the standpoint of workability and properties of a film to be formed.

In addition, additives may be added to the insulating varnish thus obtained in accordance with the present invention in order to further improve the properties of the varnish. Thus, surface active agents such as 2,4,7,9-tetramethyl-5-decyne 4,7-diol; 2,5-dimethyl-3-hexyne-2,5-diol; methylpentynol, methylbutynol or emulsifying agents such as sodium lauryl sulfate, sodium oleate may be added in an amount of not greater than 0.5% by weight of the solvent (or dispersant), which is aqueous in accordance with the present invention, in order to improve the preservative stability of the varnish. Polyethylene oxide or gum arabic may be added in an amount of 0.5 to 1.5% by weight of the solvent in order to improve the adherence of the varnish to electric conductors on which it is applied and baked. Also, as a cross linking hardener for the varnish resin when the varnish is baked, titanium chelates such as triethanolamine titanate, titanium acetyl acetate, ammonium salt of titanium lactate may be added in an amount of 0.01 to 5% by weight, calculated in terms of titanium content, of the resin content. In addition, water soluble melamine resins, polyamide resins, phenol resins, epoxy resins and the like may be added to further improve the heat resistance of the varnish.

PREFERABLE EMBODIMENT

For the preparation of the insulating varnish according to the present invention, (1) a reactant of a di- or tricarboxylic acid or derivative thereof comprising at least 95 equivalent % thereof of an aromatic dicarboxylic acid or derivative thereof, (2) a primary diol and (3) an aliphatic alcohol having at least three hydroxyl groups are first reacted to a substantially complete degree at a temperature of from room temperature to 220° C for 4 to 7 hours. At this time, a catalytic material such as, for example, lead acetate, zinc acetate, sodium carbonate, potassium carbonate, or lead naphthenate is desirably added in a catalytic amount to the starting materials in order to accelerate the esterification or ester exchange reaction. Also, a solvent such as, for example, cresol, xylenol, or solvent napththa can be added previously or in the course of the reaction to prevent sublimation of the starting materials and reduce the viscosity of the reaction product. As these solvents such as cresol may be vapourized out on heating during the reaction, they are not contained at all in an aqueous solution of the final product. In this manner, the mixture is substantially completely reacted by heating till the resin produced has an OH value of 170 to 310, preferably 170 to 250 (the OH value is the number of milligrams of KOH necessary to neutralize the acetic acid combined in the acetylated derivative of the resin produced from one gram of the resin) while preventing the resin from gellation and making the molecular weight of the resin as high as possible. For this purpose, it is convenient to terminate the reaction when ester interchange is found to achieve a level exceeding 80% from a consideration of the theoretical value of the OH value calculated when the starting material has been completely reacted by, for example, determining the OH value of the product at each stages in the course of the reaction by means of the conventional methods.

Subsequently, to the polyester resin in a molten state thus obtained is gradually added an aromatic tetracarboxylic acid or derivatives, such as dianhydride thereof, and it is reacted at a temperature above a melting point of the polyester resin but below a sublimation temperature of the tetracarboxylic racarboxylic acid or derivative thereof at which no gellation of the reaction product takes place, for example, at 130°–220° C, preferably 160°–205° C, more preferably 170°–205° C, and when the added tetracarboxylic acid or derivative thereof is all dissolved and the polymerization further proceeds and the viscosity of the reaction mixture begins to rise, the reaction is terminated. The termination of the reaction may be suitably carried out by adding ethylene glycol or glycerol to the reaction product to dilute it and to decrease the temperature of the whole reaction system at the same time or by rapidly cooling the whole reaction system removed from the reaction vessel. In the case where ethylene glycol and the like are added, a portion of the ethylene glycol or glycerol forms a solvent for the varnish of the present invention together with water, thereby forming a film with little blister upon baking. However, such additional solvent is so suppressed that the solvent portion excluding the resin content of the resulting varnish contains at least 50% of water.

Then, the so-produced polyester resin having an acid value of 70 to 140, preferably 70 to 100 (the acid value is the number of milligrams of KOH necessary to neutralize the carboxylic groups in one gram of the resin) is dispersed into water with stirring while neutralizing the remaining terminal carboxyl groups of the resin with ammonia or an organic amine, thereby producing an aqueous insulating varnish having a resin content of 20 to 60%, preferably 30 to 40% by weight.

As can be seen from the foregoing, the present invention can provide a great number of advantages which follow:

1. As the conventional polyester varnishes make use of organic solvents such as cresol as a solvent, it is impossible to avoid the occurrence of waste gases of the organic solvents which are harmful to the human body during baking. In contrast, the insulating varnishes according to the present invention make use of water as a solvent, and therefore no harmful waste gases develop at all.

2. The insulating varnish of the present invention consists of water soluble high molecular weight polyester resins having excellent heat resistance which is obtained from the starting aromatic material, and is capable of forming a film possessing far more excellent electric insulation, heat resistance, toughness than the conventional water soluble paints which may be produced from unsaturated fatty acids or alcohols.

3. The insulating varnish of the present invention is in such a state that the resin is uniformly dispersed in water as a solvent, and when it is applied and baked, cross linking beings to develop only after the solvent, i.e. water, has been completely vaporized. Therefore, the present varnishes provide a good film with less blister than the organic solvent type of varnishes which give an immediate cross linking hardening of the surfaces on which they are applied as soon as the solvent is vaporized.

The present invention will be further illustrated by the following examples.

EXAMPLE 1

8 equivalents of dimethyl terephthalate, 10 equivalents of ethylene glycol, 3 equivalents of trimethylol propane and 10 g of 15% solution of lead naphthenate were placed in a three neck flask together with 150g of solvent naphtha, and the resulting mixture was gradually heated from ambient temperature to an elevated temperature, and it as reacted at 170° C for 2.5 hours and was further heated to 220° C, at which temperature it was reacted for about 2 hours. At the end of the term, the temperature was lowered to 170°C, and to the resulting polyester resing having a OH value of about 230 was gradually added 4 equivalents of pyromellitic dianhydride (hereinafter referred to as PMDA), and they were reacted at 170° C for 10 minutes. When the viscosity of the reaction mixture was increased to an adequate degree, 200g of ethylene glycol was added to the reaction system to stop the reaction. The polyester resin thus obtained having an acid value of about 85 was added to an aqueous solution of 1.6 moles of monoethanol amine dissolved in water with stirring to give a polyester resin solution with a resin content of about 30% by weight. To the aqueous solution of polyester resin were added 1% by weight of triethanol amine titanate with respect to the weight of the resin and less than 0.5% by weight of 2,4,7,9-tetramethyl-5-decyne-4,7-diol and 1% by weight of gum arabic powder with respect to the weight of a solution to give a varnish.

This varnish was applied directly on an annealed copper wire of 1.0 mm diameter and baked in a 7.2m coating tower at 380° C at a baking speed of 10m per minute to produce a magnet wire of a coating film thickness of 0.045mm which had no blister and had a good appearance.

The properties of the magnet wire were as follows:

| | |
|---|---|
| Pinhole (number/5m) | 0 |
| Self-diameter winding | good |
| Abrasion, Repeated Scrape (load 700g) | 24 |
| Cut-through temperature (° C) | |
| (one point cross 700g load) | 340 |
| Heat shock (multiple diameter) (200° C × one hour) | ×3 good |
| Breakdown voltage (KV) | 11.6 |

EXAMPLE 2

An insulating varnish with a resin content of about 35% by weight was produced according to the same procedures as those in Example 1 except that after pyromellitic dianhydride was added and reacted the entire system was rapidly cooled instead of the addition of ethylene glycol to stop the reaction.

When the varnish obtained was applied on an annealed copper wire, the resulting magnet wire had the same good appearance as that of Example 1.

The properties of the magnet wire were as follows:

| | |
|---|---|
| Pinhole (number/5m) | 0 |
| Self-diameter winding | good |
| Abrasion resistance (load 700g) | 21 |
| Cut-through temperature (° C) (one point cross 700g load) | 335 |
| Heat shock (multiple diameter) (200° C × one hour) | ×3 good |
| Breakdown voltage (KV) | 12.0 |

EXAMPLES 3 - 12

An aqueous insulating varnish with a resin content of about 30% by weight was prepared according to the same procedures as those in Example 1 using the starting materials indicated in Table 1. Comparative Example 1 in the Table illustrates the composition of the conventional polyester resin, and in this case neutralization with amine provided no aqueous solution of the resin.

COMPARATIVE EXAMPLE 2

In the same manner as that in Example 1, 8 equivalents of dimethyl terephthalate, 10 equivalents of ethylene glycol, 3 equivalents of trimethylol propane and 4 equivalents of PMDA were placed in a three neck flask together with catalysts, etc. and the resulting mixture was reacted by heating. The result was that the product was completely gelled in the course of the reaction, so that such a resin solution as in the present invention could not be provided.

COMPARATIVE EXAMPLE 3

In the same manner as that in Example 1, 8 equivalents of dimethyl terephthalate, 10 equivalents of ethylene glycol and 3 equivalents of trimethylol-propane were placed in a three neck flask together with 150g of solvent napththa and the resulting mixture was reacted at 170° C for 2.5 hours and at 220° C for a further two hours. To the resulting polyester resin having a OH value of about 230 was added 4.5 equivalents of trimellitic anhydride and they were reacted at 170° C for 1.5 hours. When the viscosity of the reaction mixture was increased to an adequate degre, 200g of ethylene glycol as added to the reaction system to stop the reaction. The reaction product thus obtained was dispersed into a solution of 2 mols of monoethanol amine dissolved in water to give an aqueous solution with a resin content of about 30% by weight. In the same manner as that in Example 1, to this resin solution were added triethanol amine titanate, 2,4,7,9-tetramethyl-5-decyne-4,7-diol and gum arabic powder to give a varnish. This varnish was applied on an annealed copper wire having a diameter of 1.0 mm and baked by means of the conventional method. The magnet wire thus obtained had a film which was not only non-uniform in thickness, but also poor in appearance.

The results tested for the properties of the magnet wires of the afore-mentioned Examples 3 to 12 and Comparative Example 1 are shown in Table 2.

Table 1

(The figures in the table show equivalent number)

| | Constituent | Example 3 | Example 4 | Example 5 | Example 6 | Example 7 | Example 8 | Example 9 | Example 10 | Example 11 | Example 12 | Comparative Example |
|---|---|---|---|---|---|---|---|---|---|---|---|---|
| Dicarboxylic acid | Dimethyl terephthalate | 8 | 7.5 | 8 | 8 | 5.5 | 7.0 | 5.5 | 7 | 4 | 6 | 7 |
| | 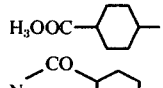 | | 0.3 | | | | | | | | | |
| Another carboxylic acid | 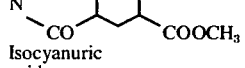 Isocyanuric acid | 0.2 | | | | | | | | | | |
| Primary diol | Ethylene glycol | 10 | 9 | 10 | 9 | | 8 | 6.0 | 8 | | 9 | 5 |
| | Bishydroxy ethyl-terephthalate | | | | | 9 | | | | 8 | | |
| Aliphatic alcohol having a valence of no less than 3 | Glycerol | | | | | | | | 6 | | 2 | 3.3 |
| | THFIC | | | 3 | 1 | | | 4.0 | | | | |
| | Trimethylol propane | 3.5 | 3.5 | | | 1 | 2 | | | | 1 | |
| Tetracarboxylic acid | PMDA | 4 | 4 | 4 | 3 | 4 | | | 3 | | 5 | |
| | Benzophenone tetracarboxylic dianhydride | | | | | | 3 | 3 | 3 | 8 | | |
| Amine and others | Monoethanol amine | 2 | 2 | 2 | | | | 2.0 | 3.2 | 4.4 | 2.9 | |
| | Triethanol amine | | | | | 1.5 | 2.0 | 1.5 | | | | |

Then, these varnishes were applied directly on an annealed copper wire in the same manner as that in Example 1 and baked by means of the conventional method to provide a magnet wire of a coating film thickness of 0.045 mm. Also, the polyester resin solution which was obtained by reacting the starting material having the composition of Comparative Example 1 in the presence of cresol as a solvent by means of the conventional method was likely applied on an annealed copper wire and baked to provide a magnet wire of a coating film thickness of 0.045 mm.

Table 2

|  | 3 | 4 | 5 | 6 | 7 | 8 | 9 | 10 | 11 | 12 | Comparative 1 | Comparative 3 |
|---|---|---|---|---|---|---|---|---|---|---|---|---|
| Pinhole (number/5m) | 0 | 0 | 0 | 0 | 0 | 0 | 0 | 0 | 0 | 0 | 0 | 0 |
| Self-diameter winding | good | good | good | good | good | good | good | good | good | good | good | bad |
| Abrasion resistance (load 700g) | 35 | 42 | 65 | 55 | 25 | 72 | 83 | 70 | 61 | 21 | 20 | 30 |
| Cut through temperature (° C) (one point cross 800g load) | 340 | 330 | 355 | 325 | 320 | 315 | 350 | 330 | 305 | 310 | 290 | 280 |
| Heat shock (multiple diameter) 150° C × one hour | ×3 good | ×3 good | ×2 good | ×3 good | ×3 good | ×3 good | ×3 good | ×3 good | ×3 good | ×3 good | ×5 good | ×5 good |
| Breakdown voltage (KV) | 15.4 | 13.0 | 13.0 | 12.0 | 10.6 | 13.3 | 11.7 | 10.9 | 11.0 | 15.5 | 10.0 | 10.0 |
| Chemical Resistance 1% NaOH (normal temperature × 24 hours) | good | good | good | good | good | good | good | good | good | good | good | good |
| Chemical Resistance $H_2SO_4$ (d : 1.2) (normal temperature × 24 hours) | good | good | good | good | good | good | good | good | good | good | good | good |

What we claim is:

1. An aqueous insulating varnish prepared by
STAGE 1: reacting to a substantially complete degree (1) a compound selected from the group consisting of an aromatic dicarboxylic acid and a lower alkyl ester thereof, (2) an aliphatic primary diol and (3) an aliphatic alcohol having at least three hydroxyl groups in quantities satisfying the requirements:

$$\frac{a}{b+c}\left(1+\frac{c}{b+c}\right) \leq 1 \text{ and } \frac{a}{b+c} \geq 0.4,$$

wherein $a$, $b$ and $c$ each represent equivalent quantities greater than zero of the compounds of (1), (2) and (3), respectively;

STAGE 2: reacting the thus produced reaction product with (4) a compound selected from the group consisting of an aromatic tetracarboxylic acid and an anhydride thereof in a quantity satisfying the requirement:

$$0.5((b+c)-a) \leq d \leq 2((b+c)-a),$$

wherein $d$ represents an equivalent quantity greater than zero of the compound of (4), at a temperature at which no gellation occurs and which is above the melting point of said reaction product but below the sublimation temperature of the compound of (4), and for a time during which no gellation occurs; and STAGE 3: subsequently dispersing the resulting product in an aqueous solution containing ammonia or an organic amine.

2. The aqueous insulating varnish according to claim 1, wherein the equivalent quantities of the compounds in (1), (2), (3) and (4) are in the ranges of from 10 to 45%, from 20 to 52%, from 3 to 25% and from 10 to 45%, respectively, of the total equivalent quantities of the compounds in (1), (2), (3) and (4).

3. The aqueous insulating varnish according to claim 1, wherein the equivalent quantities of the compounds of (1), (2), (3) and (4) are in the ranges of from 15 to 40%, from 30 to 50%, from 4 to 20% and from 13 to 40%, respectively, of the total equivalent quantities of the compounds of (1), (2), (3) and (4).

4. The aqueous insulating varnish according to claim 1, wherein after the compound in (4) is reacted in said stage 2, ethylene glycol is added to the reaction system thereby to stop the reaction.

5. The aqueous insulating varnish according to claim 1 wherein the aromatic dicarboxylic acid in (1) is selected from terephthalic acid and isophthalic acid.

6. The aqueous insulating varnish according to claim 1 wherein the compound of (2) is ethylene glycol.

7. The aqueous insulating varnish according to claim 1 wherein the compound of (3) is tris-2-hydroxyethyl isocyanurate.

8. The aqueous insulating varnish according to claim 1 wherein the compound of (3) is trimethylol propane.

9. The aqueous insulating varnish according to claim 1 wherein the compound of (4) is pyromellitic dianhydride.

10. The aqueous insulating varnish according to claim 1 wherein the compound of (4) is benzophenone tetracarboxylic dianhydride.

11. The aqueous insulating varnish according to claim 1 wherein the dispersion of the reaction product dispersed in an aqueous solution containing ammonia or a volatile organic amine has a pH value ranging from 5.0 to 8.0.

12. The aqueous insulating varnish according to claim 1 wherein the organic amine is monoethanol amine.

13. The aqueous insulating varnish according to claim 1 wherein the reaction in said stage 1 is continued till the acid value of the reaction product reaches the range between 170 and 310.

14. The aqueous insulating varnish according to claim claim 1 wherein the reaction in said stage 2 is continued till the acid value of the reaction product reaches the range between 70 and 140.

15. The aqueous insulating varnish according to claim 1 wherein the reaction in said stage 2 is continued till the acid value of the reaction product reaches the range between 70 and 100.

16. The aqueous insulating varnish according to claim wherein a titanium chelate is added to the aqueous solution which is the final reaction product.

17. The aqueous insulating varnish according to claim 16, wherein the titanium chelate is a member selected from the group consisting of triethanolamine titanate, titanium acetylacetate and ammonium salt of titanium lactate.

18. The aqueous insulating varnish according to claim 1 wherein a titanium chelate and 2,4,7,9-tetramethyl-5-decyne-4,7-diol are added to the aqueous solution which is the final reaction product.

19. The aqueous insulating varnish according to claim 1 wherein a titanium chelate and polyethylene oxide are added to the aqueous solution which is the final reaction product.

20. The aqueous insulating varnish according to claim 1, wherein the reaction in said stage 2 is carried out at a temperature of from 160 to 250° C.

21. The aqueous insulating varnish according to claim 1, wherein the varnish has a resin content in the range between 20 to 60% by weight.

22. The aqueous insulating varnish according to claim 21, wherein the solvent portion of the varnish contains at least 50% by weight of water.

* * * * *